United States Patent
Ogawa et al.

(10) Patent No.: US 12,213,463 B2
(45) Date of Patent: Feb. 4, 2025

(54) TOOL FOR CLEANING INSIDE OF WATER TANK

(71) Applicant: SUISAKU CO. LTD., Tokyo (JP)

(72) Inventors: Yasuhiro Ogawa, Tokyo (JP); Yutaka Yoshida, Tokyo (JP)

(73) Assignee: Suisaku Co., Ltd., Tokyo (JP)

( * ) Notice: Subject to any disclaimer, the term of this patent is extended or adjusted under 35 U.S.C. 154(b) by 343 days.

(21) Appl. No.: 17/797,331

(22) PCT Filed: Feb. 2, 2021

(86) PCT No.: PCT/JP2021/003663
§ 371 (c)(1),
(2) Date: Aug. 3, 2022

(87) PCT Pub. No.: WO2021/192619
PCT Pub. Date: Sep. 30, 2021

(65) Prior Publication Data
US 2023/0054027 A1    Feb. 23, 2023

(30) Foreign Application Priority Data
Mar. 23, 2020   (JP) ................. 2020-051758

(51) Int. Cl.
*A01K 63/10*   (2017.01)
*B08B 1/16*    (2024.01)
(Continued)

(52) U.S. Cl.
CPC .............. *A01K 63/10* (2017.01); *B08B 1/165* (2024.01); *B08B 5/04* (2013.01); *B08B 9/087* (2013.01);
(Continued)

(58) Field of Classification Search
CPC .......... A01K 63/10; B08B 1/165; B08B 5/04; B08B 9/087; B08B 15/04; B08B 9/0933; B08B 2209/08; Y02A 40/81
(Continued)

(56) References Cited

U.S. PATENT DOCUMENTS 5,601,322 A * 2/1997 Forest ................. A01K 63/006
7/168
8,733,385 B2   5/2014 Ogawa et al.
(Continued)

FOREIGN PATENT DOCUMENTS

GB    2 015 331 A   9/1979
JP    S54-130099 U  9/1979
(Continued)

OTHER PUBLICATIONS

Machine-generated English translation of JP 2010-57475, generated on Sep. 6, 2024.*
(Continued)

*Primary Examiner* — Fred Prince
(74) *Attorney, Agent, or Firm* — Carrier, Shende & Associates P.C.; Joseph P. Carrier; Fulchand P. Shende

(57) ABSTRACT

A tool for cleaning inside of a water tank utilizing a siphon action is provided in which a scraping tool (S) is pivotably provided at an upstream end of a suction pipe (P), a deposit (b) such as moss caked on a bottom face or a side face within the water tank is scraped off by a scraping blade (62) formed at an extremity of the scraping tool (S), and is removed by sucking up together with dirt (a).

5 Claims, 8 Drawing Sheets

(51) Int. Cl.
*B08B 5/04* (2006.01)
*B08B 9/08* (2006.01)
*B08B 9/087* (2006.01)
*B08B 15/04* (2006.01)
*B08B 9/093* (2006.01)

(52) U.S. Cl.
CPC ............ *B08B 15/04* (2013.01); *B08B 9/0933* (2013.01); *B08B 2209/08* (2013.01); *Y02A 40/81* (2018.01)

(58) Field of Classification Search
USPC ................. 15/401, 93.1; 210/167.21, 167.23
See application file for complete search history.

(56) References Cited

U.S. PATENT DOCUMENTS

| | | | |
|---|---|---|---|
| 10,004,210 | B1 | 6/2018 | Laz |
| 2007/0051320 | A1 | 3/2007 | Yen |
| 2019/0323251 | A1* | 10/2019 | Norberto, Jr. ........ B01D 35/157 |

FOREIGN PATENT DOCUMENTS

| | | |
|---|---|---|
| JP | H08-131984 A | 5/1996 |
| JP | 3547820 B2 | 7/2004 |
| JP | 2010-57475 A | 3/2010 |
| JP | 2018-074930 A | 5/2018 |

OTHER PUBLICATIONS

Machine-generated English translation of JP H08-131984, generated on Sep. 6, 2024.*

* cited by examiner

TOOL FOR CLEANING INSIDE OF WATER TANK

TECHNICAL FIELD

The present invention relates to a tool for cleaning an inside of a water tank for breeding aquarium fish, the tool enabling dirt such as fish excrement or residual food to be removed and a deposit such as moss caked on an inner face of the water tank to be scraped off.

BACKGROUND ART

Conventionally, a tool for cleaning the inside of a water tank that enables replacement of water and cleaning of a water tank bottom part to be carried out all at once by sucking up water tank water together with dirt such as fish excrement or residual food is already known (for example, Patent Document 1 below).

PRIOR ART DOCUMENTS

Patent Documents

Patent Document 1: Japanese Patent Application Laid-open No. 2010-57475

SUMMARY OF THE INVENTION

Problems to be Solved by the Invention

In the arrangement of Patent Document 1 above, a siphon action is established by providing, between a main body portion 1 and a grip portion 2 of a suction pipe P, an upstream-side one-way valve Vu and a downstream-side one-way valve Vd and sucking up water tank water into the suction pipe by the operation of a suction operation tool, thus enabling dirt such as fish excrement or residual food remaining on a bottom face of the water tank to be removed by continuous sucking up of water tank water. However, there is the problem that it is difficult to remove a deposit such as moss caked on the bottom face, etc. within the water tank.

It is an object of the present invention to provide a novel tool for cleaning the inside of a water tank that enables a deposit such as moss caked on an inner face of the water tank to be removed without difficulty even when gravel is laid on a bottom face within the water tank.

Means for Solving the Problems

In order to attain the above object, according to a first aspect of the present invention, there is provided a tool for cleaning inside of a water tank, the tool comprising a suction pipe that is formed by connecting a grip portion to an upper end of a main body portion formed so as to have a length that reaches from an outside of a water tank to a bottom of the water tank, a flexible water conduit pipe connected to an outer end of the suction pipe, and an upstream-side one-way valve and a downstream-side one-way valve that are provided within the suction pipe across a gap and allow water to flow only from the suction pipe to the water conduit pipe, water tank water within the water tank being sucked up by virtue of a siphon action and discharged to the outside of the water tank, characterized in that a scraping tool is pivotably provided at the outer end of the suction pipe, the scraping tool scraping off a deposit sticking to and deposited on a wall face within the water tank, and the scraping tool having formed therein a guideway guiding the deposit scraped off to the suction pipe.

In order to attain the above object, according to a second aspect of the present invention, in addition to the first aspect, the scraping tool is formed into a spatula shape, and a scraping blade spreading out in a fan shape is formed at the outer end of the scraping tool.

In order to attain the above object, according to a third aspect of the present invention, in addition to the first or second aspect, the suction pipe is provided with a suction operation tool that pressurizes or depressurizes an interior of a water passage between the upstream-side one-way valve and the downstream-side one-way valve.

Effects of the Invention

In accordance with the first aspect of the present invention, with regard to the tool for cleaning inside of a water tank, since the scraping tool for scraping off a deposit sticking to and deposited on a wall face within the water tank is pivotably provided at the outer end of the suction pipe, and the scraping tool has formed therein the guideway guiding the deposit scraped off to the suction pipe, it is possible to easily scrape off a deposit such as moss caked on an inner face of the water tank and discharge it to the outside of the water tank together with dirt that is sucked up, thus enabling the water tank to be kept more clean.

Furthermore, in accordance with the second aspect of the present invention, since the scraping tool is formed into a spatula shape, and the scraping blade spreading out in a fan shape is formed at the outer end of the scraping tool, it is possible to easily scrape off a deposit sticking to an inner face of the water tank over a wide area.

Moreover, in accordance with the third aspect of the present invention, since the suction pipe is provided with the suction operation tool, which pressurizes or depressurizes the interior of the water passage between the upstream-side one-way valve and the downstream-side one-way valve, it is possible to establish a siphon action in the suction pipe by the pushing operation of the suction operation tool.

EXPLANATION OF REFERENCE NUMERALS AND SYMBOLS

Figure 1:
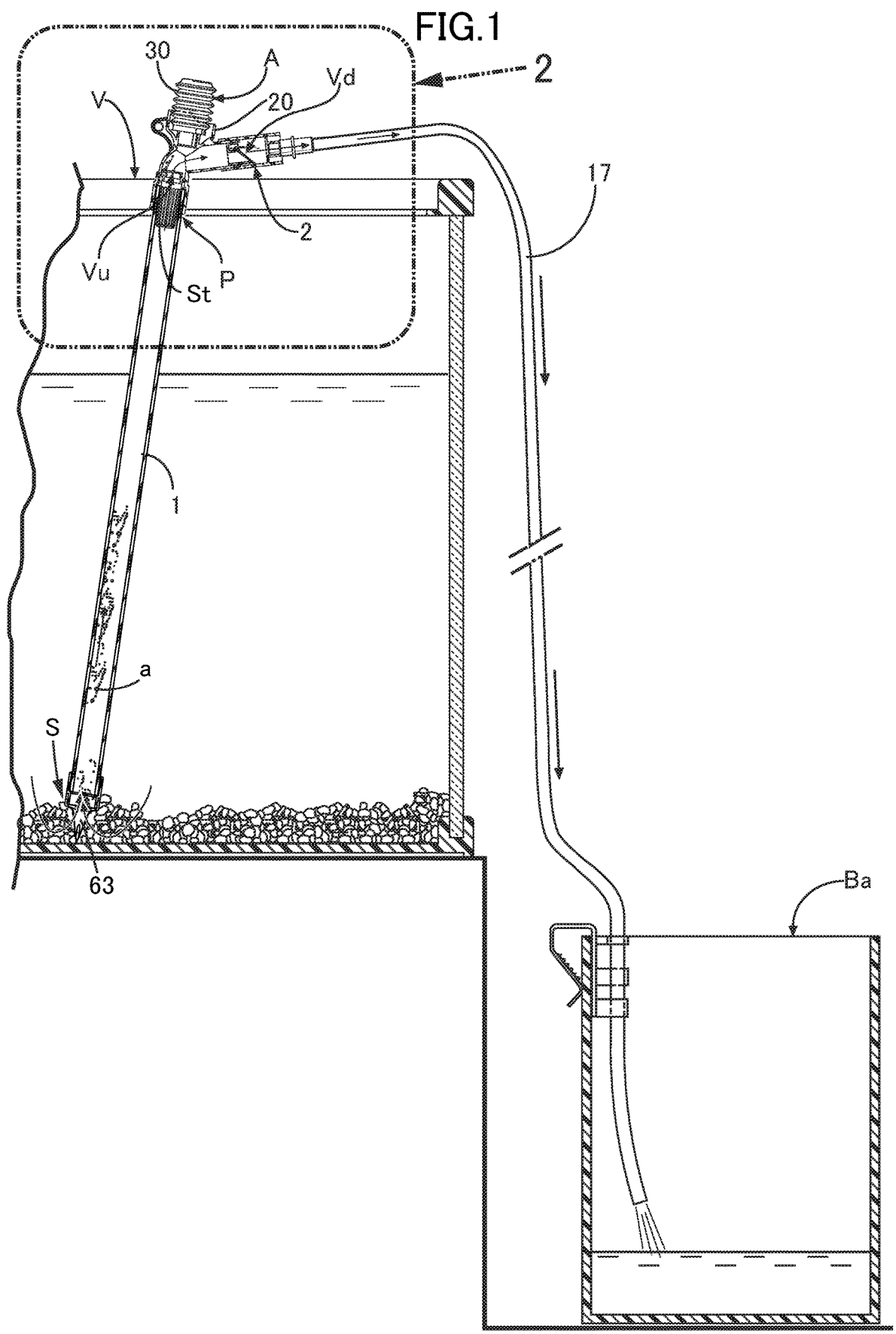
FIG. 1 is an overall sectional side view of a tool for cleaning the inside of a water tank. (first embodiment)

1 Main body portion
2 Grip portion

9 Valve holder
10 Valve port
11 Valve body
17 Water conduit pipe
24 Water passage
62 Scraping blade
63 Guideway (opening part)
A Suction operation tool
P Suction pipe
V Water tank
Vu Upstream-side one-way valve
Vd Downstream-side one-way valve
S Scraping tool

MODE FOR CARRYING OUT THE INVENTION

A mode for carrying out the present invention is explained below by reference to an embodiment of the present invention shown in the attached drawings.

First Embodiment

Figure 2:
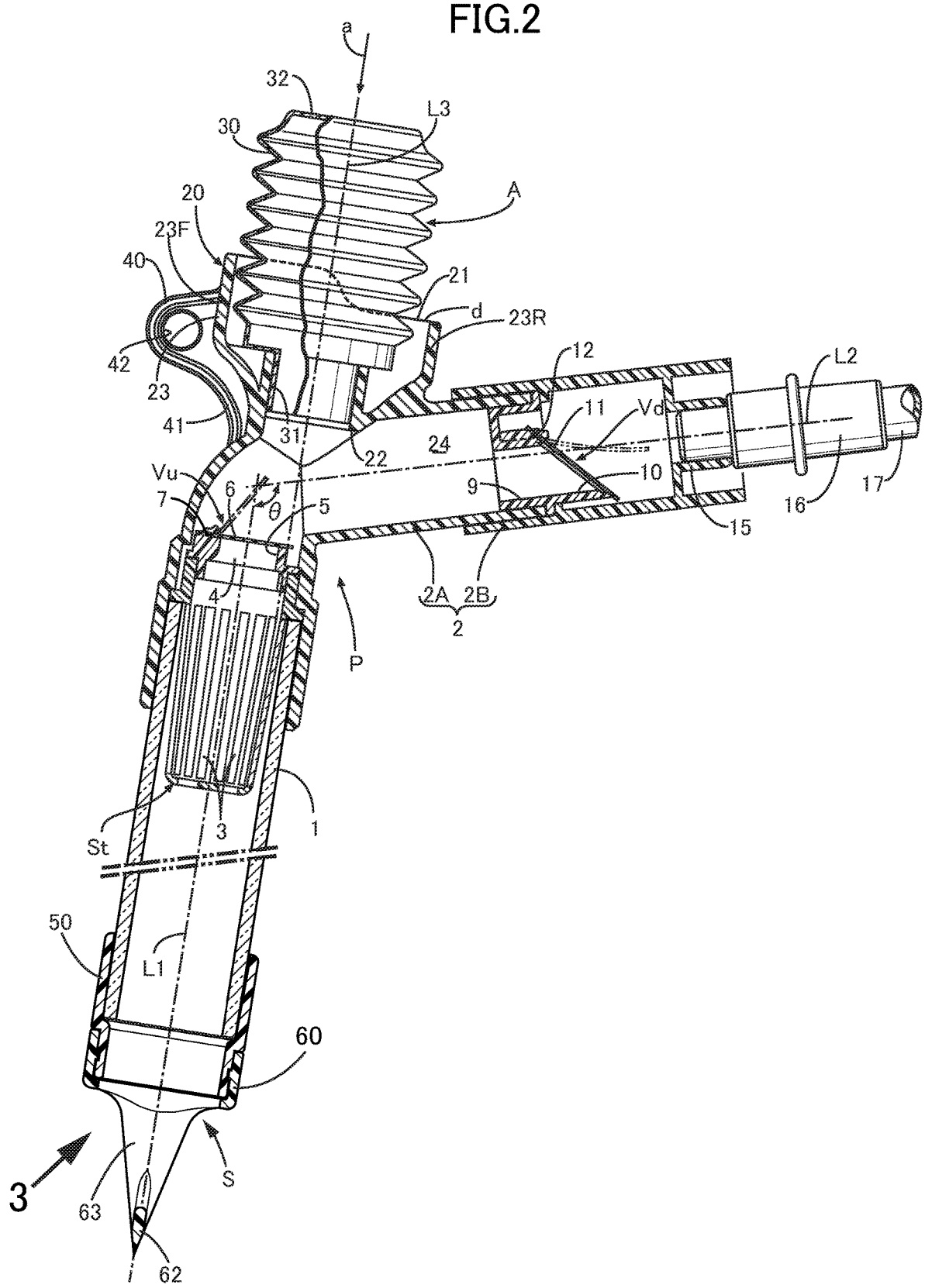
FIG. 2 is an enlarged sectional view from arrow 2 in FIG. 1. (first embodiment)

As shown in FIGS. 1 and 2, a suction pipe P that forms a main body part of a tool for cleaning the inside of a water tank is formed from a transparent hard synthetic resin material and is formed, into a peak shape in side view, from a straight cylindrical main body portion 1 that is formed so as to have a length extending from the outside of a water tank V to the bottom of the water tank V and opens at the lower end (upstream end), and a grip portion 2 that is bendingly connected to and communicates with the upper end (downstream end) of the main body portion 1. The grip portion 2 is formed by removably and water-tightly connecting an elbow pipe 2A and a straight pipe 2B.

An angle θ formed between a central axis L1 of the main body portion 1 and a central axis L2 of the grip portion 2 is an obtuse angle, that is, about 105°, this making it difficult for the grip portion 2 to abut against the edge of the water tank V when the tool for cleaning the inside of a water tank is used, thus improving the ease of operation.

A truncated cone-shaped strainer St having bored therein a large number of slits 3 is provided in the interior of the connecting part between the upper end (downstream side) of the main body portion 1 of the suction pipe P and the lower end (upstream end) of the grip portion 2, this strainer St allowing dirty water contaminated with fine dirt such as residual food or fish excrement to freely pass through but preventing coarse dirt such as dead leaves or stones from passing through. An upstream-side one-way valve Vu is provided at the rear end, that is, an outlet, of the strainer St.

This upstream-side one-way valve Vu includes a tubular valve holder 4 that is fixed to the outlet of the strainer St, and a valve body 6 that has a hinge link 7 to the outer end of the valve holder 4 so that it can be opened and closed and that can open and close a valve port 5 opening on an outer face of the valve holder 4. The valve body 6 is formed from a flexible thin synthetic resin plate, tightly seated on the valve port 5 so that it can be opened and closed, and acts so as to allow water tank water having passed through the strainer St and flowing in the suction pipe P to flow from the upstream side (lower side) to the downstream side (upper side) but to prevent it from flowing in reverse.

A downstream-side one-way valve Vd is provided in a downstream portion of the suction pipe P that is further downstream than the upstream-side one-way valve Vu. This downstream-side one-way valve Vd is sandwiched and fixed between an elbow pipe 2A and a straight pipe 2B of the grip portion 2, and is formed from a cylindrical valve holder 9 having a valve port 10 opening at the downstream end, and a valve body 11 that has a hinge link 12 to the valve holder 9 and opens and closes the valve port 10. The valve port 10 is formed into an elliptical shape so as to be downwardly obliquely cut from the upstream side to the downstream side of the suction pipe P; the valve body 11, which opens and closes the valve port 10, is also formed into an elliptical shape and has the hinge link 12 to the upper side of the valve holder 9, the downstream-side one-way valve Vd being opened and closed by virtue of water pressure of water flowing in the interior of the suction pipe P.

As shown in FIG. 2, a connecting pipe 15 is integrally connected within the downstream end of the grip portion 2, and the upstream end of a water conduit pipe 17 is connected to the connecting pipe 15 via a joint 16.

As shown in FIG. 1, the water conduit pipe 17 is formed so as to have a length that, when the extremity of the suction pipe P faces a bottom part within the water tank V, the downstream end of the water conduit pipe 17 reaches lower than the water level of the water tank V, that is, a length that gives a siphon action to a cleaning tool, which is described later.

A suction operation tool A for sucking up water into the interior of the suction pipe P is provided on a curved upper face of the elbow pipe 2A of the grip portion 2. This suction operation tool A is formed from an operating part 20 provided integrally with the curved upper face of the elbow pipe 2A and bellows 30 mounted on the operating part 20. The operating part 20 is formed into a short cylindrical shape that extends upward from the curved upper face of the elbow pipe 2A and opens on an upper face 21 and a lower face 22, the opening lower face 22 communicating with the upstream side of the interior of the suction pipe P and the interior of a water passage 24 between the upstream- and downstream-side one-way valves Vu, Vd, and the opening upper face 21 being open to the exterior. With regard to a cylindrical side wall 23 of the operating part 20, a rear side half 23R on its rear side, that is, on the water conduit pipe 17 side, is lower than a front side half 23F on its front side, that is, on the main body portion 1 side, and the rear side half 23R acts as a digit-receiving recess part. This digit-receiving recess part makes it easy for a thumb to push the bellows 30 to the most contracted position. The bellows 30 are formed from bag-shaped bellows whose upper face is closed, have an access opening 31 opening at the lower end and a pressing face 32 formed at the upper end, and are retained in an elongated state due to the self-resilient force when it is in its free state. No other member is present in the interior of the bellows 30; a lower part thereof is housed within the operating part 20, the access opening 31 is connected to and communicates with the opening lower face 22 of the operating part 20, and a majority of the bellows 30 is exposed to the exterior via the operating part 20. A central axis L3 of the bellows 30 passes through the interior of the main body portion 1 of the suction pipe P.

When the pressing face 32 is pushed in a direction shown by arrow a in FIG. 2, the bellows 30 are compressed, the water passage 24 is pressurized, the upstream-side one-way valve Vu is closed, and the downstream-side one-way valve Vd is opened. When the pressing force acting on the pressing face 32 is released, the bellows 30 are restored to an elongated position by virtue of the self-resilient force, and the water passage 24 is depressurized, thus opening the upstream-side one-way valve Vu and at the same time closing the downstream-side one-way valve Vd.

A finger piece 40 is integrally formed so as to straddle a front face of the operating part 20 and a front face of the grip portion 2, and an arc-shaped finger recess part 41 is formed at the edge of the finger piece 40, an operator placing their finger on the finger recess part 41. A hanging hole 42 opens in the finger piece 40. When the cleaning tool is not being used, it can be hung down from an appropriate hanger by utilizing the hanging hole 42.

A scraping tool S is pivotably connected to the lower end (upstream end) of the suction pipe P, the scraping tool S scraping off a deposit b such as moss caked on an inner wall face of the water tank V.

Figure 3:
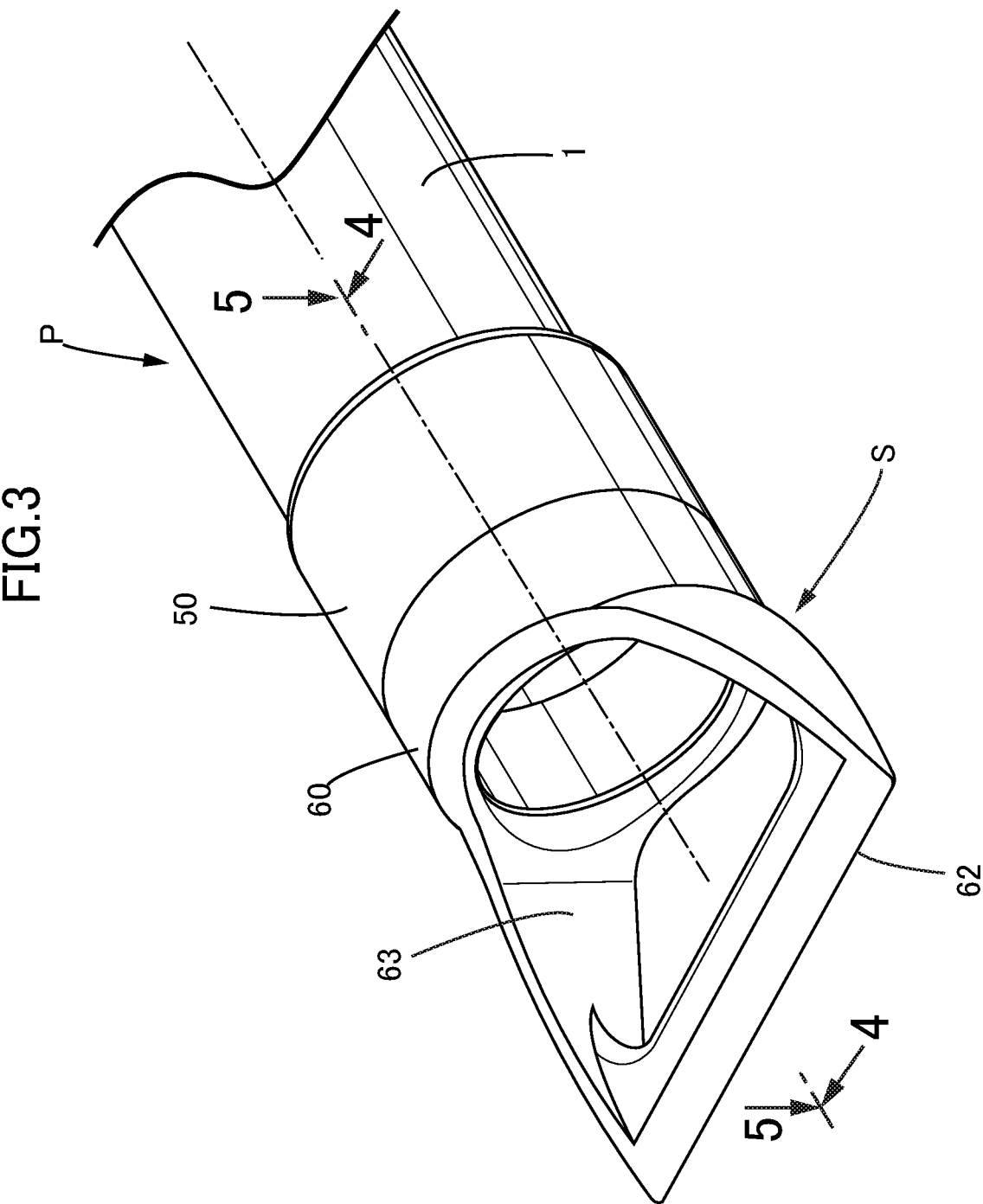
FIG. 3 is an enlarged perspective view from arrow 3 in FIG. 2. (first embodiment)
Figure 4:
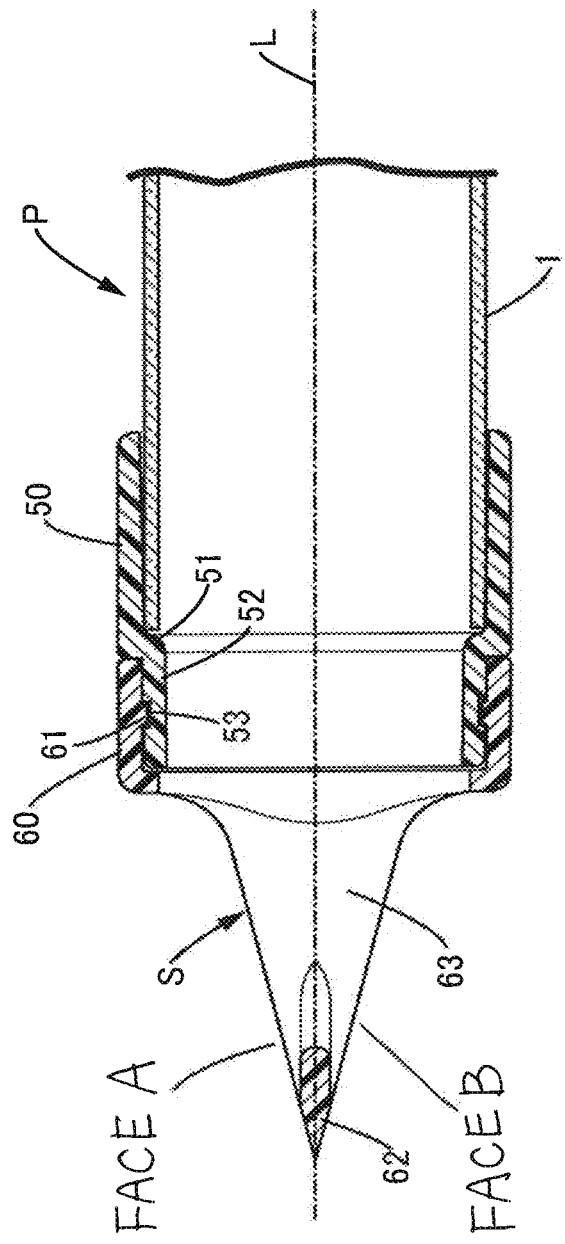
FIG. 4 is a sectional view along line 4-4 in FIG. 3. (first embodiment)
Figure 5:
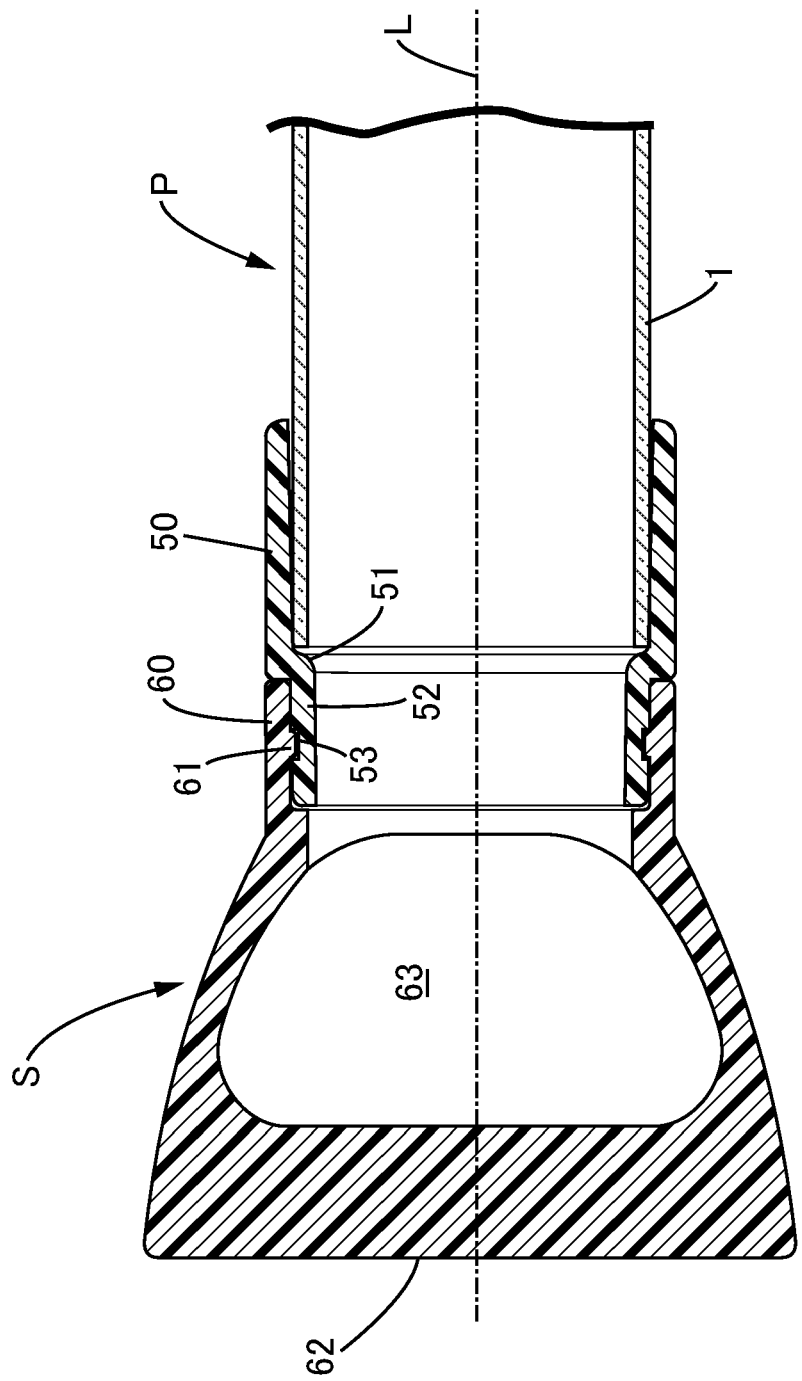
FIG. 5 is a sectional view along line 5-5 in FIG. 3. (first embodiment)

The structure of the scraping tool S is now explained by reference to FIGS. 3 to 5.

A connecting pipe 50 is pivotably connected to the lower end of the suction pipe P. A connecting part 52 is provided at the free end of the connecting pipe 50 via a step part 51, and a connecting part 60 of the scraping tool S is pivotably engaged, via a fitting projection part 61, with a fitting recess part 53 of the connecting part 52. This enables the scraping tool S to freely pivot with respect to the suction pipe P.

The scraping tool S is formed into a spatula shape, spreads widely in a fan shape from its base part toward the extremity, and extends in a radial direction along a center line L of the suction pipe P. A scraping blade 62 is formed at the free end of the scraping tool S so as to have a linear shape in a radial direction. A center part of the scraping tool S is widely open to the exterior on opposite sides thereof, indicated by face A and face B in FIG. 4, and the opening part, that is, a guideway 63, communicates with the interior of the suction pipe P, and communicates with a discharge passage for dirt. As shown, the scraping tool is symmetrically structured relatively to a symmetry plane defined by the center line L.

Figure 6:
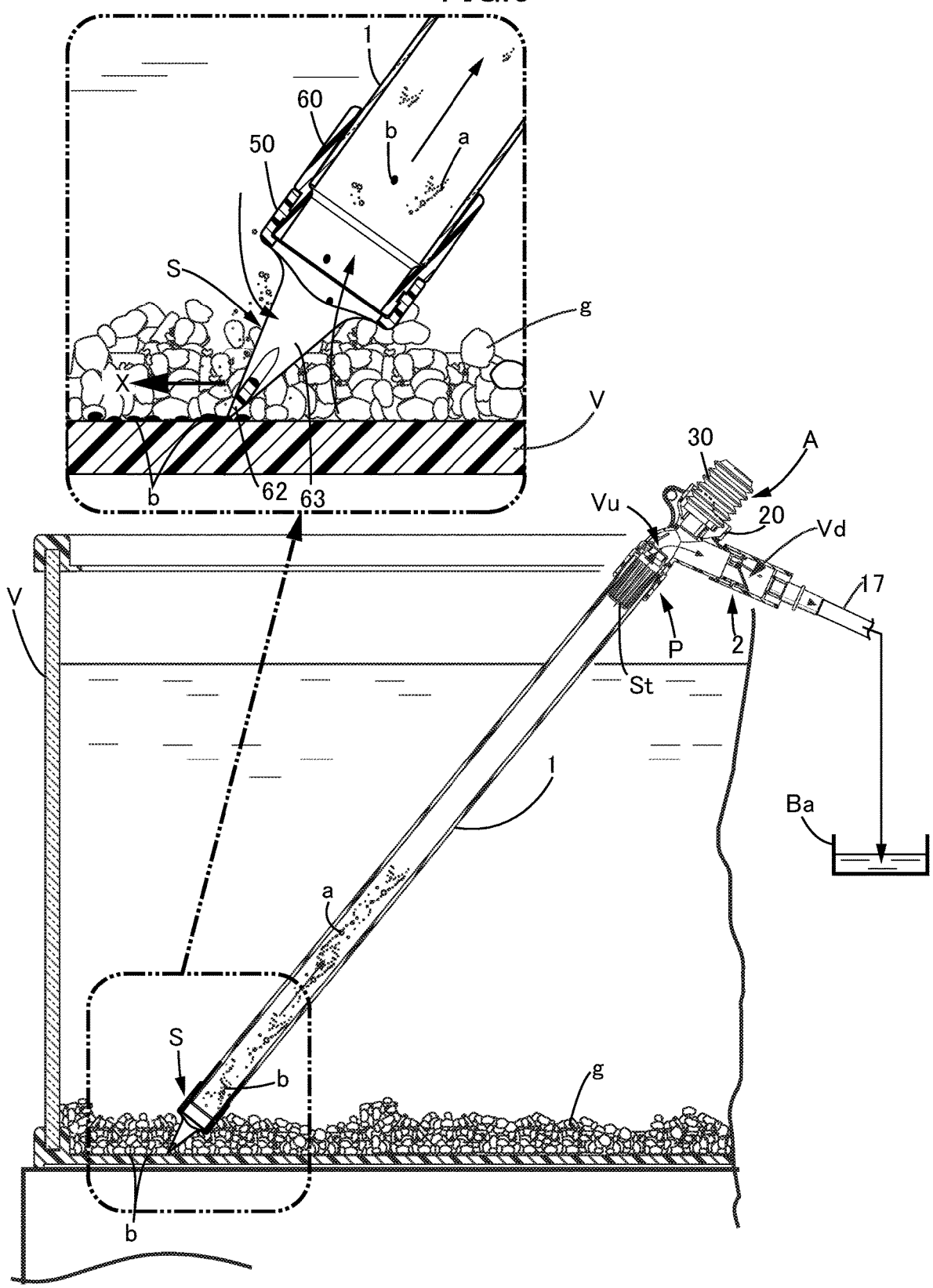
FIG. 6 is an operational drawing showing a state in which moss caked on a bottom face within the water tank is being removed. (first embodiment)

As shown in FIG. 6, the suction pipe P is made to enter the interior of the water tank V, the scraping blade 62 of the scraping tool S is made to abut against the bottom face of the water tank V, and the scraping blade 62 is moved in a direction shown by arrow X, thus enabling the deposit b such as moss caked on the bottom face of the water tank V to be scraped off, and at the same time enabling the dirt a remaining on the bottom face of the water tank V to be sucked up.

In this process, even if gravel g is laid down on the bottom face of the water tank V, the gravel g will not interfere with the scraping blade 62, and the scraping blade 62 can be made to abut against the bottom face of the water tank V.

Figure 7:
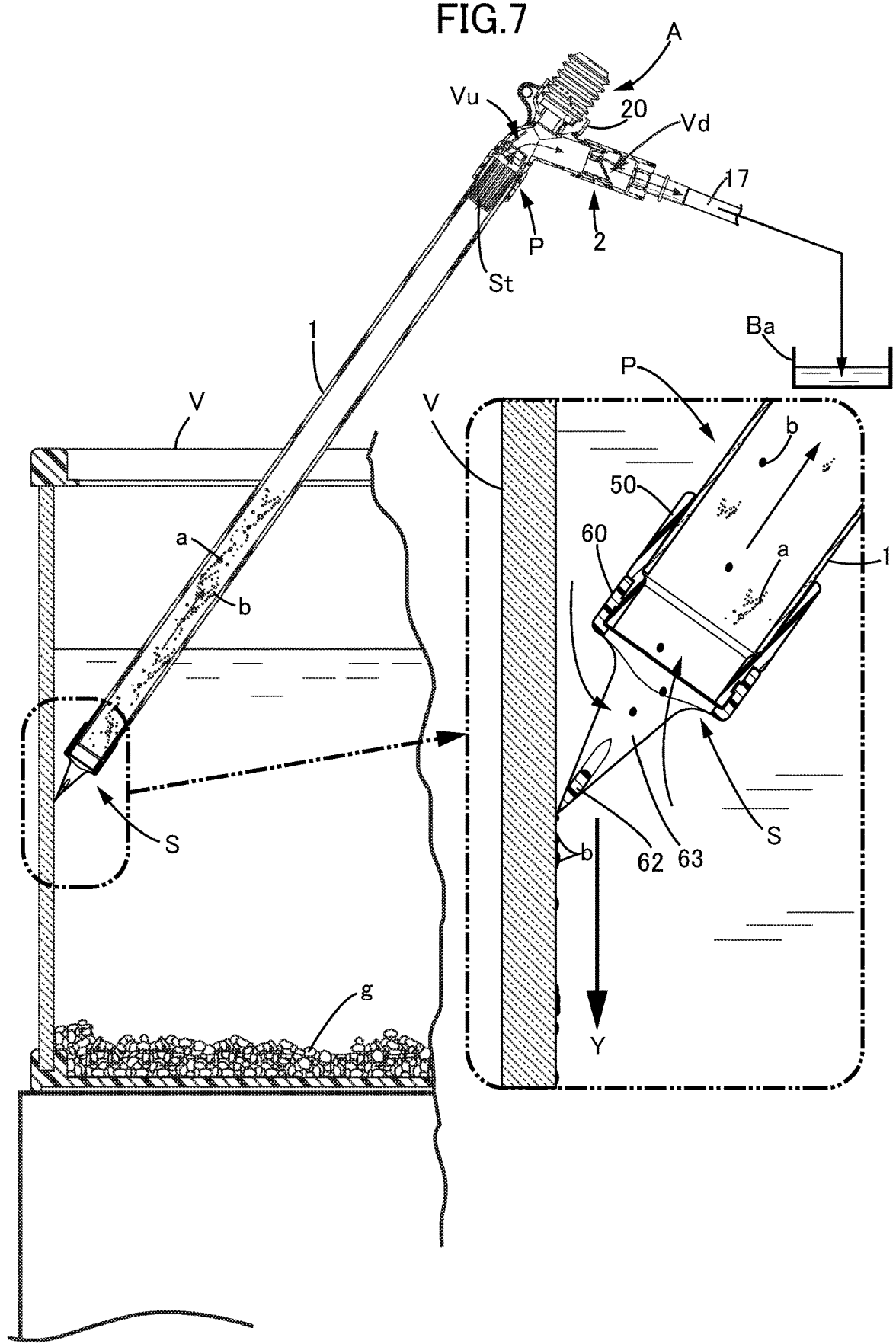
FIG. 7 is an operational drawing showing a state in which moss caked on a side face within the water tank is being removed. (first embodiment)

As shown in FIG. 7, when the scraping blade 62 is made to abut against a side face of the water tank V and is moved in a direction shown by arrow Y, the deposit b such as moss caked on the side face within the water tank V can be scraped off, and at the same time the dirt a remaining on the side face of the water tank V can be sucked up. Based on the symmetrical structure of the scraping tool relative to the symmetry plane defined by the center line L, the scraping tool can be moved in a first direction parallel to a side wall face of the water tank, in particular a downwards direction, and in a second direction being opposite to the first direction, in particular an upwards direction, without change in angle of the scraping tool with respect to a side face of the water tank.

Figure 8:
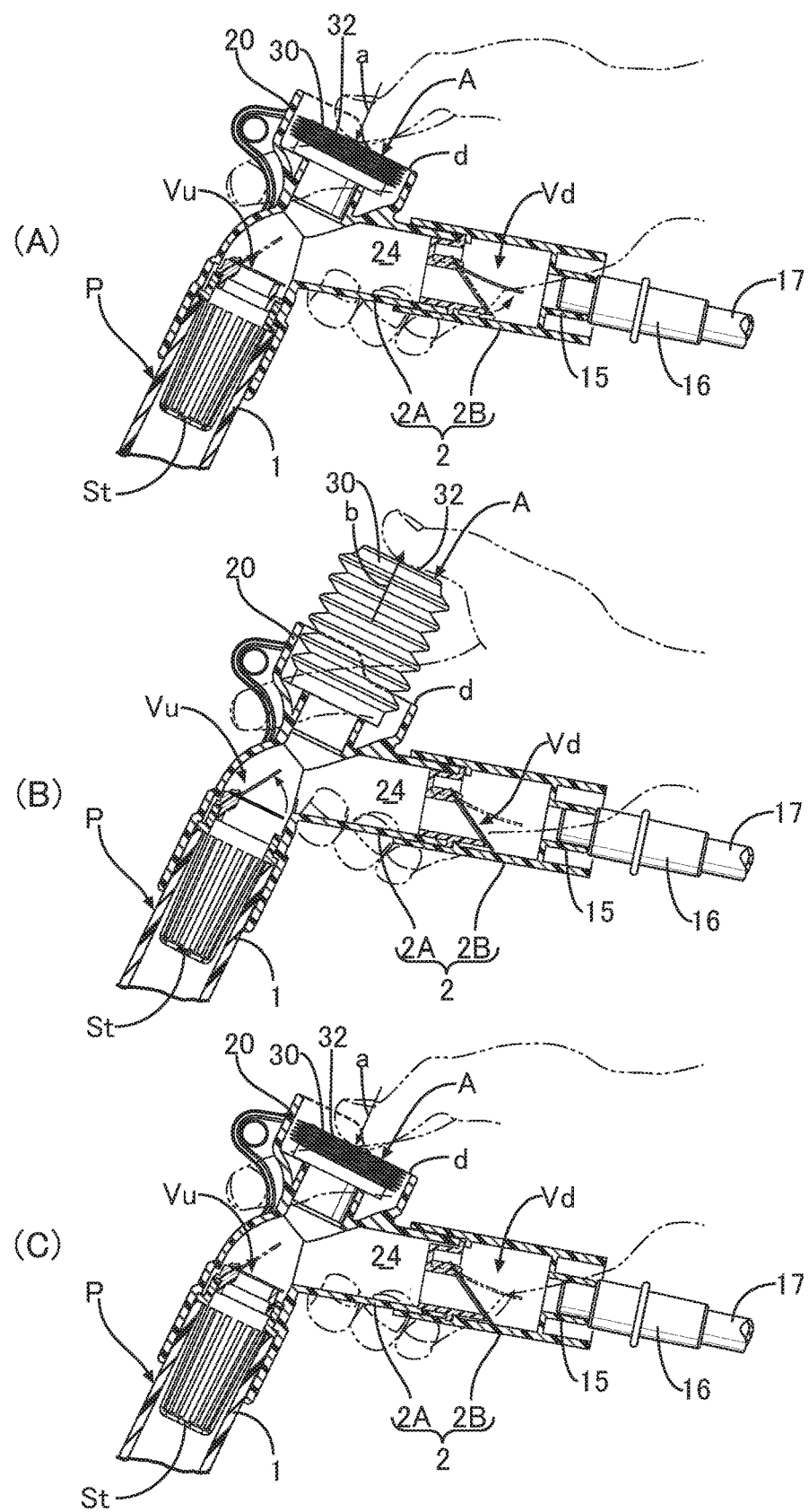
FIG. 8 is a sectional view showing the operation of the tool for cleaning the inside of a water tank. (first embodiment)

The operation of the embodiment is now explained by reference to FIGS. 1 and 8.

As shown in FIG. 1, the open free end of the water conduit pipe 17 is made to enter a collection vessel Ba such as a bucket, and the grip portion 2 is gripped by a single hand.

The main body portion 1 of the suction pipe P is immersed within water tank water of the water tank V in the vertical direction. In this process, water within the water tank V enters the suction pipe P up to partway therealong (water level), both the upstream-side and downstream-side one-way valves Vu, Vd are thereby opened, part of the air within the suction pipe P is discharged into the water conduit pipe 17, and the air is released to the outside air.

Subsequently, as shown in FIG. 8(A), while the grip portion 2 is gripped by a single hand, the pressing face 32 of the bellows 30 of the suction operation tool A is pressed by the thumb as shown by arrow a, and the bellows 30 are thereby compressed. The volume of the bellows 30 is thus decreased, the interior of the water passage 24 is pressurized, the upstream-side one-way valve Vu is closed, and the downstream-side one-way valve Vd is opened.

In this process, as shown in FIG. 2, since the rear side half 23R of the side wall 23 of the operating part 20 acts as the digit-receiving recess part, which is lower than the front side half 23F, the thumb does not interfere with the operating part 20 and the bellows 30 can be compressed to the vicinity of the most contracted position as shown in FIG. 8(A), and the pressurizing force within the water passage 24 can be increased.

Subsequently, as shown in FIG. 8(B), when the pressure on the bellows 30 is released, the bellows 30 elongate as shown by arrow b, the volume thereof increases, the interior of the water passage 24 is reduced in pressure, the upstream-side one-way valve Vu is opened, and the downstream-side one-way valve Vd is closed. This allows water tank water to be sucked up into the suction pipe P, and part of the water thus sucked up also flows into the bellows 30.

As shown in FIG. 8(C), when the bellows 30 are pressed again as shown by arrow a, the interior of the water passage 24 is pressurized again, the upstream-side one-way valve Vu is closed, and the downstream-side one-way valve Vd is opened.

Repeating the above operation several times enables water tank water within the water tank V to be forcibly sucked up into the suction pipe P by a pumping action generated in the interior of the suction pipe P, a siphon action is established, and thereafter water flowing within the suction pipe P attains a continuous flow and water within the water tank V is discharged to the exterior without carrying out the above operation.

In accordance with the above embodiment, as described above, since the scraping tool S is pivotably connected to the outer end of the suction pipe P, it is possible to scrape off, by means of the scraping tool S, the deposit b such as moss caked on the bottom face or the side face within the water tank V, and to suck up the deposit b, together with the dirt a such as fish excrement or residual food remaining therearound, into the suction pipe P through the opening part 63.

An embodiment of the present invention is explained above, but the present invention is not limited to the embodiment, and various embodiments are possible within the scope of the present invention.

The invention claimed is:

1. A tool for cleaning inside of a water tank, the tool comprising a suction pipe that is formed by connecting a grip portion to an upper end of a main body portion formed so as to have a length that reaches from an outside of a water tank to a bottom of the water tank, a flexible water conduit pipe connected to an outer end of the suction pipe, and an upstream-side one-way valve and a downstream-side one-way valve that are provided within the suction pipe across a gap and allow water to flow only from the suction pipe to the water conduit pipe, water tank water within the water tank being sucked up by virtue of a siphon action and discharged to the outside of the water tank, wherein a scraping tool being formed into a spatula shape with a face A and a face B and is pivotably provided at the outer end of the suction pipe, the scraping tool being configured to scrape off a deposit sticking to and deposited on a wall face within the water tank, and the scraping tool having formed in a center part thereof an opening part forming a guideway guiding the deposit scraped off to the suction pipe so that the opening part is open to an exterior and communicates the face A with the face B, wherein a scraping blade is formed at the outer end of the scraping tool, and wherein the scraping blade of the scraping tool is configured to abut against a bottom wall face of the water tank so that when the scraping blade is moved in a direction parallel to the bottom wall face of the water tank deposit on the bottom wall face, including any moss caked thereon, is scraped off, at the same time the deposit scraped off and dirt on the bottom wall face will be sucked up into the suction pipe through the opening part, and when gravel is disposed on the bottom wall face the gravel will not interfere with the scraping of the scraping blade.

2. The tool for cleaning inside of a water tank according to claim 1, wherein the scraping blade spreads out in a fan shape.

3. The tool for cleaning inside of a water tank according to claim 2, wherein the suction pipe is provided with a suction operation tool that pressurizes or depressurizes an interior of a water passage between the upstream-side one-way valve and the downstream-side one-way valve.

4. The tool for cleaning inside of a water tank according to claim 1, wherein the suction pipe is provided with a suction operation tool that pressurizes or depressurizes an interior of a water passage between the upstream-side one-way valve and the downstream-side one-way valve.

5. The tool for cleaning inside of a water tank according to claim 1, wherein the scraping tool is symmetrically structured relatively to a symmetry plane defined by a center line of the suction pipe and the scraping blade, such that the scraping tool can be moved in a downwards direction parallel to a side wall face of the water tank and in an upwards direction opposite to the downwards direction without change in angle of the scraping tool with respect to a side face of the water tank.

* * * * *